United States Patent
Chen

(10) Patent No.: US 8,001,133 B2
(45) Date of Patent: Aug. 16, 2011

(54) METHOD AND APPARATUS FOR MANAGING A CONTACT LIST

(75) Inventor: Po-Chun Chen, Taipei (TW)

(73) Assignee: E-Ten Information Systems Co., Ltd, Taipei (TW)

( * ) Notice: Subject to any disclaimer, the term of this patent is extended or adjusted under 35 U.S.C. 154(b) by 365 days.

(21) Appl. No.: 12/233,449

(22) Filed: Sep. 18, 2008

(65) Prior Publication Data

US 2009/0083299 A1    Mar. 26, 2009

(30) Foreign Application Priority Data

Sep. 21, 2007  (TW) ............................... 96135412 A

(51) Int. Cl.
*G06F 17/30* (2006.01)

(52) U.S. Cl. ........ 707/752; 707/755; 715/234; 715/240; 715/242

(58) Field of Classification Search .................. 707/752, 707/755; 715/234, 242, 240
See application file for complete search history.

(56) References Cited

U.S. PATENT DOCUMENTS

| | | | |
|---|---|---|---|
| 7,505,568 B2 * | 3/2009 | Simpson et al. ........... 379/88.01 |
| 2004/0119755 A1 * | 6/2004 | Guibourge .................... 345/827 |
| 2005/0055639 A1 | 3/2005 | Fogg |
| 2005/0198031 A1 | 9/2005 | Pezaris et al. |
| 2008/0059570 A1 * | 3/2008 | Bill ............................... 709/203 |
| 2008/0059627 A1 * | 3/2008 | Hamalainen et al. ......... 709/224 |
| 2008/0147639 A1 * | 6/2008 | Hartman et al. ................... 707/5 |
| 2008/0147733 A1 * | 6/2008 | Cohen et al. ............... 707/104.1 |
| 2009/0043856 A1 * | 2/2009 | Darby ........................... 709/206 |
| 2009/0187549 A1 * | 7/2009 | Samn ................................. 707/4 |
| 2010/0042600 A1 * | 2/2010 | Orr et al. .......................... 707/4 |

FOREIGN PATENT DOCUMENTS

TW     1268090     12/2006

OTHER PUBLICATIONS

Taiwanese Search Report dated May 3, 2011 issued in TW Application No. 096135412, 1 page.

* cited by examiner

*Primary Examiner* — Luke S. Wassum
*Assistant Examiner* — Noosha Arjomandi
(74) *Attorney, Agent, or Firm* — Christie, Parker & Hale, LLP

(57) ABSTRACT

A method of managing a contact list in a communication system includes: a) in response to user manipulation, generating a contact identification (ID) representing a contact person in the communication system, and presenting the contact ID on the contact list; b) keeping track of a contact frequency between the user and the contact person; c) selecting an attribute in accordance with the contact frequency; and d) presenting the attribute on the contact list, such that the attribute is associated with the contact ID. An apparatus for managing a contact list in a communication system is also disclosed.

18 Claims, 4 Drawing Sheets

METHOD AND APPARATUS FOR MANAGING A CONTACT LIST

CROSS-REFERENCE TO RELATED APPLICATION

This application claims priority of Taiwanese Application No. 096135412, filed on Sep. 21, 2007.

BACKGROUND OF THE INVENTION

1. Field of the Invention

The invention relates to a method and an apparatus for managing a contact list, in which indications are provided on the contact list such that a user is able to ascertain his or her degree of intimacy with contact persons represented on the contact list by contact identifications.

2. Description of the Related Art

A contact list is a collection of contact identifications (IDs) which are used to represent actual other people ("contact persons") in a communication system. Contact lists are used in a variety of applications, such as in instant messaging and email programs, as well as in mobile phones.

In the case of instant messaging, a conventional contact list typically provides status information of each contact person represented on the contact list. For example, a symbol may be presented next to each of the contact IDs to show that the particular contact person is offline, online, away, etc. Apart from such status information, however, more detailed information of the contact persons is not provided on conventional contact lists.

SUMMARY OF THE INVENTION

Therefore, an object of the present invention is to provide a method and an apparatus for managing a contact list, in which indications are provided on the contact list such that a user is able to ascertain his or her degree of intimacy with contact persons represented on the contact list by contact identifications.

According to one aspect of the present invention, the method of managing a contact list in a communication system comprises: a) in response to user manipulation, generating a contact identification (ID) representing a contact person in the communication system, and presenting the contact ID on the contact list; b) keeping track of a contact frequency between the user and the contact person; c) selecting an attribute in accordance with the contact frequency; and d) presenting the attribute on the contact list, such that the attribute is associated with the contact ID.

According to another aspect of the present invention, the apparatus for managing a contact list in a communication system comprises: a contact list module having the contact list stored therein; an attribute library module having a plurality of attributes stored therein; and an intimacy degree calculating module coupled to said contact list module and said attribute library module. The intimacy degree calculating module is configured to perform steps of the method of managing the contact list of the present invention, and in step c), one of the attributes is selected from the attribute library module.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
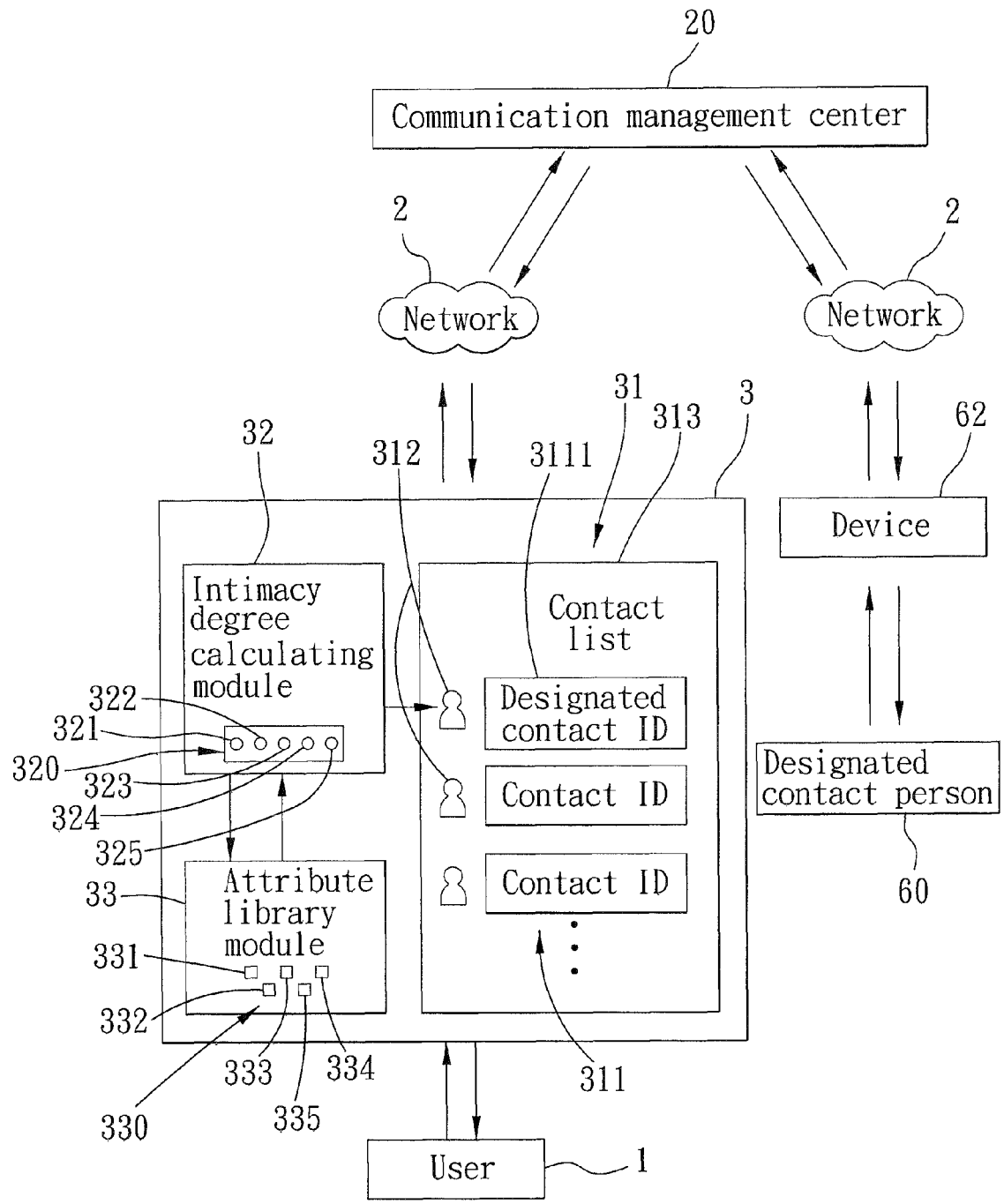
FIG. 1 is a schematic circuit block diagram of an apparatus for managing a contact list according to a preferred embodiment of the present invention.

Before the present invention is described in greater detail with reference to the accompanying preferred embodiments, it should be noted herein that like elements are denoted by the same reference numerals throughout the disclosure.

FIG. 1 shows an apparatus 3 for managing a contact list 313 in a communication system according to a preferred embodiment of the present invention. The apparatus 3 is connected to a communication management center 20 via a network 2. A user 1 of the apparatus 3 communicates with a designated contact person 60 who is utilizing a device 62 that is also connected to the communication management center 20 via the network 2. The apparatus 3 includes a contact list module 31 having the contact list 313, an attribute library module 33 having a plurality of attributes 330 stored therein, and an intimacy degree calculating module 32 coupled to the contact list module 31 and the attribute library module 33. The intimacy degree calculating module 32 is configured to perform steps of a method of managing the contact list 313 according to a preferred embodiment of the present invention.

Figure 2:
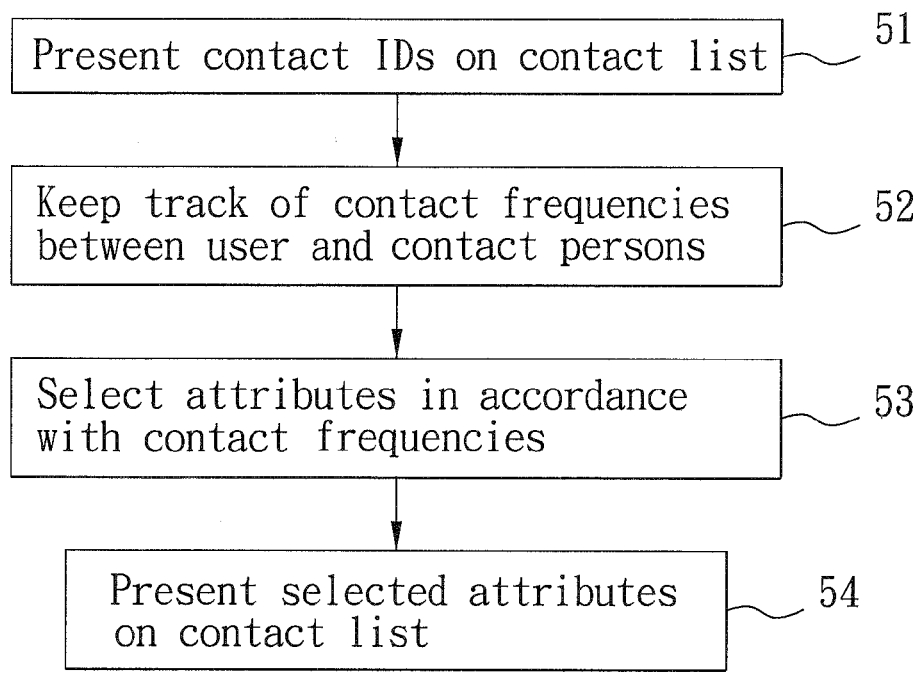
FIG. 2 is a flowchart of a method of managing a contact list according to a preferred embodiment of the present invention.

Referring additionally to FIG. 2, the method of managing the contact list 313 includes the steps as described below.

In step 51, in response to user manipulation, a plurality of contact IDs 311 representing a plurality of contact persons in the communication system are generated, and the contact IDs 311 are presented on the contact list 313. One of the contact IDs 311 is a designated contact ID 3111 which represents the designated contact person 60. It is to be noted that for the remainder of this disclosure, any reference to "contact persons" should be interpreted as including also the designated contact person 60, even when not explicitly mentioned.

Next, in step 52, control is performed to keep track of contact frequencies between the user 1 and the contact persons, including the designated contact person 60.

Subsequently, in step 53, the attributes 330 are selected from the attribute library module 33 in accordance with the contact frequencies between the user 1 and the contact persons (including the designated contact person 60). That is, one of the attributes 330 is selected from the attribute library module 33 in accordance with the contact frequency between the user 1 and each of the contact persons and the designated contact person 60.

In step 54, the selected attributes 330 are presented on the contact list 313, such that the selected attributes 330 are associated respectively with the contact IDs 311 representing the contact persons and the designated contact person 60.

Hence, in the present invention, contact frequencies between the user 1 and each of the contact persons (including the designated contact person 60) are deemed to be related to the degree of intimacy between the user 1 and each of the contact persons.

Figure 3:
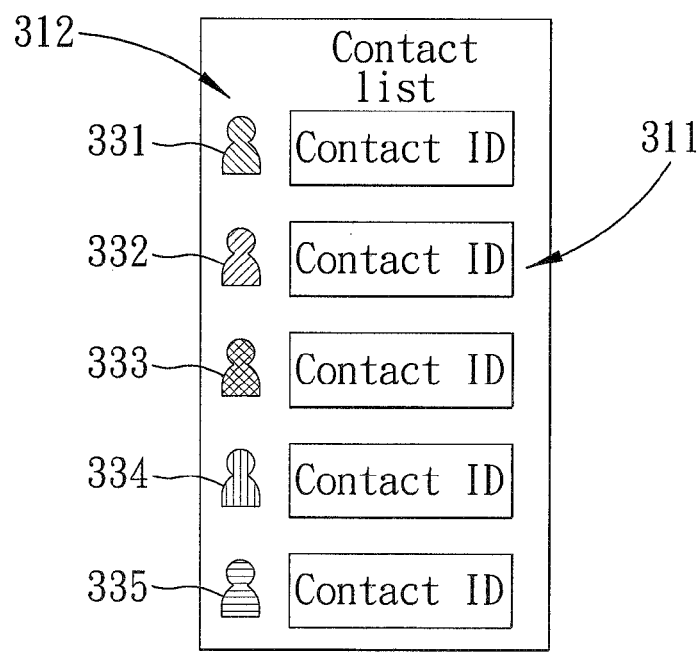
FIG. 3 is a schematic diagram of an exemplary contact list obtained using the method of the preferred embodiment.

In one embodiment, the attributes 330 stored in the attribute library module 33 are different colors, and the method of managing the contact list 313 further includes generating icons 312 associated respectively with the contact IDs 311. In such an embodiment, in step 54, the selected attributes 330 are used to color the icons 312, respectively. FIG. 3 shows an example of how the contact list 313 might appear in this embodiment. In FIG. 3, the different line configurations represent different colors used to color the icons 312 depending on the contact frequencies between the user 1 and the contact persons. In an alternative embodiment, the selected attributes 330 are used to color the contact IDs 311, in which case it is unnecessary to generate the icons 312.

In other embodiments, the attributes 330 stored in the attribute library module 33 are different sizes or color shades. For example, when the attributes 330 stored in the attribute library module 33 are different sizes, in step 54, the selected attributes 330 are used to vary sizes of the contact IDs 311, or, when the icons 312 associated respectively with the contact IDs 311 are generated, the selected attributes 330 are used to vary sizes of the icons 312. In such an embodiment, a larger size may be used to indicate a greater degree of intimacy between the user 1 and each of the contact persons.

Further, when the attributes 330 stored in the attribute library module 33 are different color shades, in step 54, the selected attributes 330 are used to vary color shades of the contact IDs 311, or, when icons 312 associated respectively with the contact IDs 311 are generated, the selected attributes 330 are used to vary color shades of the icons 312. For example, in this embodiment involving color shades, RGB values of the attributes 330 may be adjusted as the contact frequencies between the user 1 and the contact persons vary. For example, if the contact frequency between the user 1 and the designated contact person 60 is increased, the R value of the attribute 330 may be increased by a factor of 10 (e.g., on a scale of 0 to 255) while the G value thereof may be decreased by a factor of 10, such that the color shade of the designated contact ID 3111 or the icon 312 associated therewith becomes more red, indicating greater intimacy between the user 1 and the designated contact person 60. Alternatively, after the color shades have been applied to the contact IDs 311 or the icons 312, the RGB values may be adjusted directly on the contact IDs 311 or the icons 312 as the contact frequencies vary.

In still other embodiments, the selected attributes 330 are icon shapes. In such embodiments, the method of managing the contact list 313 further includes generating icons 312 which are associated with the contact IDs 311, and in step 54, the selected attributes 330 are used to determine shapes of the icons 312. Therefore, in these embodiments, different shapes (e.g., triangles squares, smiley faces, etc.) may be used to indicate different degrees of intimacy between the user 1 and the contact persons.

It is to be noted that the attributes 330 stored in the attribute library module 33 may be any combination of the above colors, sizes, color shades, and shapes. For example, a combination of a color and a size may be used to indicate the degree of intimacy between the user 1 and each of the contact persons.

In some embodiments, in step 53, the selected attributes 330 are selected based on the relation of the contact frequencies to a plurality of threshold values 320 which are stored in the intimacy degree calculating module 32. As an example, assuming that there are five different attributes 331-335 which represent five different colors, and that there are five different threshold values 321-325, if the contact frequency between the user 1 and the designated contact person 60 exceeds the threshold value 321 but fails to exceed the threshold value 322, the attribute 331 is selected in step 53 for use in step 54 to present on the contact list 53 in a manner associated with the designated contact ID 3111.

Furthermore, in some embodiments, the contact frequencies used in step 53 to select the attributes 330 are determined based on an accumulated total number of communication sessions between the user 1 and the contact persons. In other embodiments, the contact frequencies used in step 53 to select the attributes 330 are determined based on a total number of communication sessions between the user 1 and the contact persons within a predetermined time period. Furthermore, the contact frequencies used in step 53 may be determined based on the number of communication sessions (total or within a predetermined time period) that are initiated by the user 1, initiated by the contact persons (including the designated contact person 60), or both.

Figure 4:
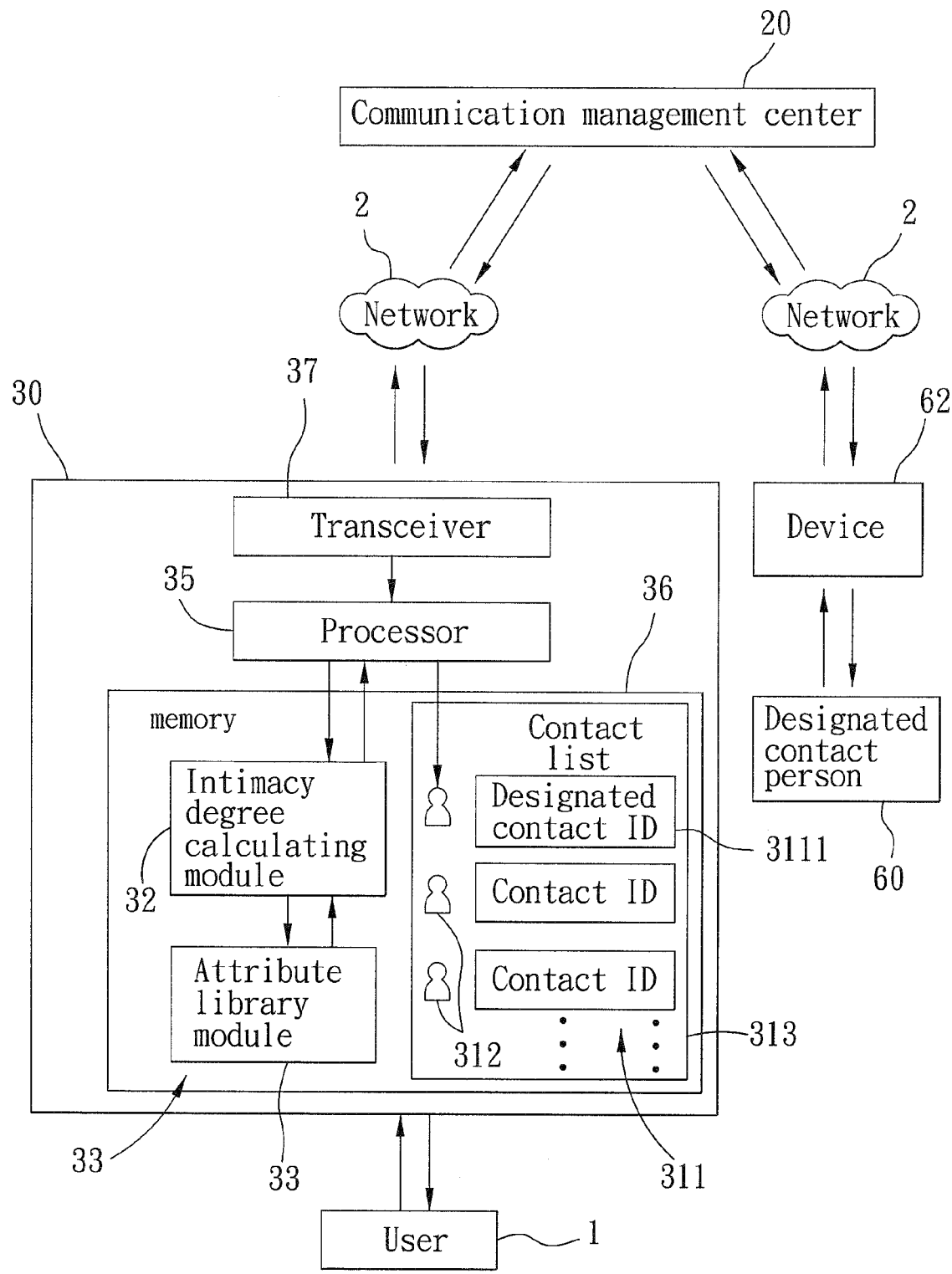
FIG. 4 is a schematic circuit block diagram of an electronic apparatus according to a preferred embodiment of the present invention.

In one embodiment, the apparatus 3 of the present invention is contained in a computer-readable storage medium as part of a device for performing communication in the communication system. FIG. 4 shows an example of such an implementation. In FIG. 4, an electronic device 30 is shown to include a transceiver 37 connected to the network 2, a processor 35 coupled to the transceiver 37 and responsible for overall control of the electronic device 30, and a memory 36 coupled to the processor 35 and including the apparatus 3. In this embodiment, the intimacy degree calculating module 32 may be a collection of algorithms which are used by the processor 35 of the electronic device 30 to perform the steps of the method of managing the contact list 31 according to the present invention. Stated differently, in this embodiment, the contact list module 31, the attribute library module 33, and the intimacy degree calculating module 32 may be software modules resident in the memory 36 of the electronic device 30. Furthermore, in this embodiment, while the attribute library module 33 and the intimacy degree calculating module 32 of the apparatus 3 are described as being included in the memory 36, in other embodiments, each of the attribute library module 33 and the intimacy degree calculating module 32 may be a system-on-a-chip (SoC) included as part of the processor 35.

Furthermore, the communication system in which the apparatus 3 of the preferred embodiment operates may be a mobile phone system in some embodiments, or may be based on a client-server architecture in other embodiments. When the communication system is a mobile phone system, the method of managing the client list 313 of the present invention is performed by a mobile phone of the user 1, i.e., the apparatus 3 resides in the mobile phone of the user 1. In such an embodiment, the communication management center 20 may be a mobile switching center of the mobile phone system, and the device 62 may be a mobile phone of the designated contact person 60. Furthermore, in such an embodiment where the communication system is a mobile phone system, the electronic device 30 may be the mobile phone of the user 1, and the apparatus 3 may be included in the memory 36 of the mobile phone as described above with reference to FIG. 4.

Figure 5:
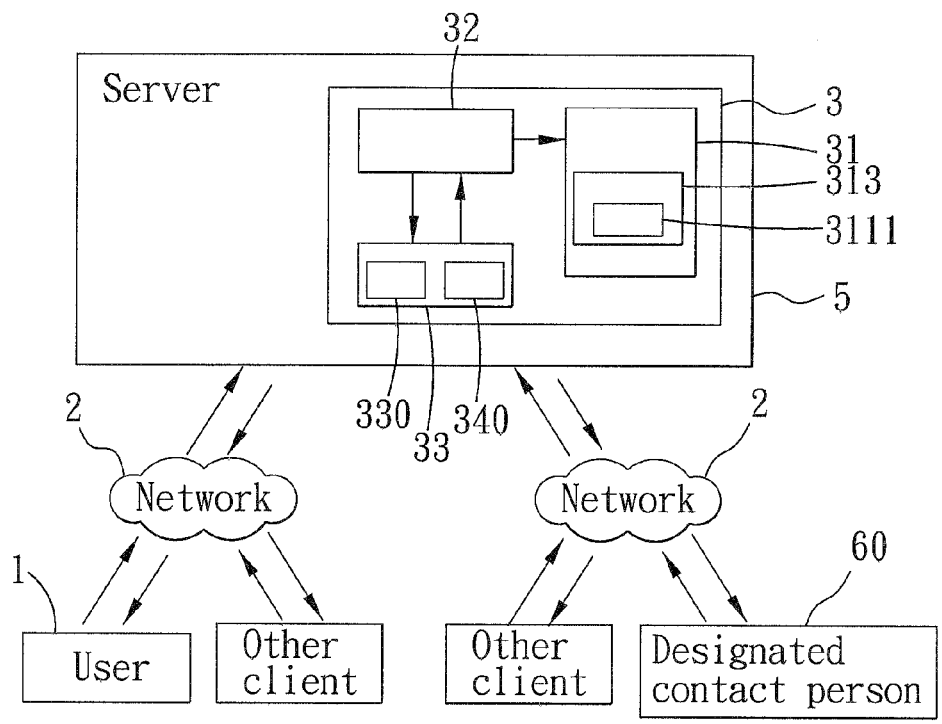
FIG. 5 is a schematic circuit block diagram of a server according to a preferred embodiment of the present invention.

In embodiments where the communication system is based on a client-server architecture, with additional reference to FIG. 5, the apparatus 3 of the present invention may be contained in a server 5 of the communication system, i.e., the server 5 of the communication system is configured to perform steps of the method of managing the contact list 313 according to the preferred embodiment. As an example, the communication system may be an instant messaging system or an email system, and the server 5 may be an instant messaging server or an email server. Hence, the communication system of the present invention may involve real-time communication, as in the case of instant messaging, or may involve communication that is not performed in real-time, such as email.

Furthermore, as is evident from the above examples of different embodiments, the contact list 313 may be a contact list for an instant messaging system, an address book for a mobile phone, a contact list in an email program, or any other name list of contacts for use in a communication system.

Referring to FIGS. 1 and 4, in the case where the communication system is an instant messaging system, and assuming the embodiment in which the icons 312 are generated and the selected attributes 330 are used to color the icons 312, respectively, the method of managing the contact list 313 may further include coloring only a portion of the icons 312 in response to the contact persons (including the designated contact person 60) logging out of the instant messaging system.

Further, again with reference to FIGS. 1 and 4, in the case where the communication system is an instant messaging system, and assuming the embodiment in which the selected attributes 330 are icon shapes, the icons 312 are generated, and the selected attributes 330 are used to determine shapes of the icons 312, the method of managing the contact list 313 may further include only partially presenting the icons 312 in response to the contact persons (including the designated contact person 60) logging out of the instant messaging system.

Figure 6:
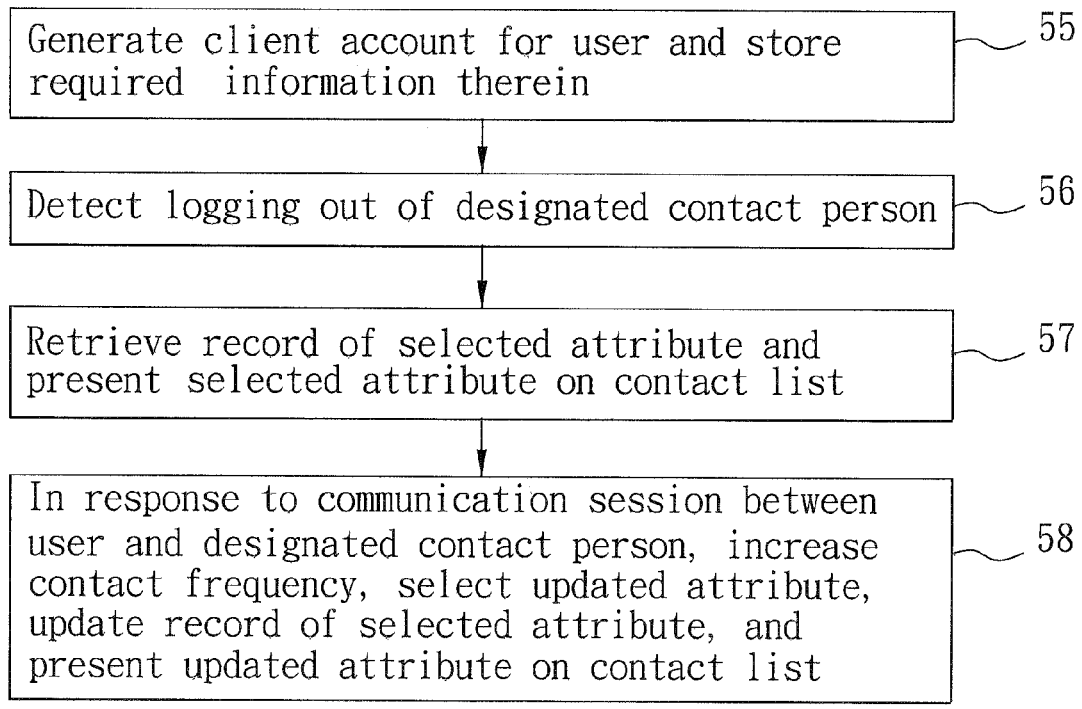
FIG. 6 is a flowchart of additional steps involved in the preferred embodiment of the method of managing a contact list when the method is performed by an instant messaging system.

Referring to FIGS. 5 and 6, additional steps involved in the method of managing the contact list 313 according to the preferred embodiment when the communication system is an instant messaging system will now be described. To simplify the description, it is assumed that the only contact person of the user 1 is the designated contact person 60.

First, in step 55, a client account is generated for the user, and the contact list 313, the designated contact ID 3111, the contact frequency, and a record of the selected attribute 330 is stored in the client account.

Assuming that the selected attribute 330 is presented on the contact list 313 in step 54 described above when the designated contact person 60 is logged into the communication system, in step 56, detection is performed when the designated contact person 60 logs out of the communication system, and after such detection, the selected attribute 330 is either removed or only partially presented on the contact list 313.

Next, in step 57, in response to the designated contact person 60 again logging into the communication system, the record of the selected attribute 330 is retrieved, and the selected attribute 330 is fully presented on the contact list 313, such that the selected attribute 330 is associated with the designated contact ID 3111.

Subsequently, in step 58, when there is a communication session between the user 1 and the designated contact person 60, the contact frequency is increased by a predetermined amount, and if the increased contact frequency exceeds a predetermined value, an updated attribute 340 is selected in accordance with the increased contact frequency, the record of the selected attribute 330 is updated to correspond to the updated attribute 340, and the updated attribute 340 is presented on the contact list 313, such that the updated attribute 340 is associated with the designated contact ID 3111.

In the method and apparatus of managing the contact list 313 of the present invention described above, the attributes 330 are selected in accordance with the contact frequencies between the user 1 and the contact persons (including the designated contact person 60), after which the selected attributes 330 are presented on the contact list 313. As a result, the user 1 is able to quickly determine his or her degree of intimacy with each contact person represented on the contact list 313.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method of managing a contact list in a communication system, said method being performed by a server of the communication system, which is based on a client-server architecture, the contact list being stored in the server, said method comprising:
   a) in response to user manipulation, generating a contact identification (ID) representing a contact person in the communication system, and presenting the contact ID on the contact list;
   b) keeping track of a contact frequency between the user and the contact person;
   c) selecting an attribute in accordance with the contact frequency;
   d) presenting the attribute on the contact list, such that the attribute is associated with the contact ID, the attribute being presented on the contact list when the contact person is logged into the communication system;
   e) generating a client account for the user, and storing the contact list, the contact ID, the contact frequency, and a record of the selected attribute in the client account;
   f) detecting when the contact person logs out of the communication system, and one of removing and only partially presenting the selected attribute on the contact list;
   g) in response to the contact person again logging into the communication system, retrieving the record of the selected attribute and fully presenting the selected attribute on the contact list, such that the selected attribute is associated with the contact ID; and
   h) when there is a communication session between the user and the contact person, increasing the contact frequency by a predetermined amount, and if the increased contact frequency exceeds a predetermined value, selecting an updated attribute in accordance with the increased contact frequency, updating the record of the attribute to correspond to the updated attribute, and presenting the updated attribute on the contact list, such that the updated attribute is associated with the contact ID.

2. The method of claim 1, wherein the attribute is one of a color, a size, and a color shade.

3. The method of claim 2, wherein the attribute is used to one of color the contact ID, vary a size of the contact ID, and vary a color shade of the contact ID.

4. The method of claim 2, further comprising generating an icon which is associated with the contact ID, and wherein, in step d), the attribute is used to one of color the icon, vary a size of the icon, and vary a color shade of the icon.

5. The method of claim 4, wherein the communication system is an instant messaging system, said method further comprising coloring only a portion of the icon in response to the contact person logging out of the instant messaging system.

6. The method of claim 1, wherein the attribute is an icon shape, said method further comprising generating an icon which is associated with the contact ID, and in step d), the attribute is used to determine a shape of the icon.

7. The method of claim 6, wherein the communication system is an instant messaging system, said method further comprising only partially presenting the icon in response to the contact person logging out of the instant messaging system.

8. The method of claim 1, wherein, in step c), the attribute is selected based on the relation of the contact frequency to a plurality of threshold values.

9. The method of claim 1, wherein the contact frequency is determined based on one of an accumulated total number of communication sessions between the user and the contact person, and a total number of communication sessions between the user and the contact person within a predetermined time period.

10. An apparatus for managing a contact list in a communication system, the communication system being based on a client-server architecture, said apparatus comprising:
  a contact list module having the contact list stored therein;
  an attribute library module having a plurality of attributes stored therein;
  an intimacy degree calculating module coupled to said contact list module and said attribute library module; and
  a processor coupled to the intimacy degree calculating module and configured with the intimacy degree calculating module to perform steps of managing the contact list;
  wherein the steps of managing the contact list include:
  a) in response to user manipulation, generating a contact identification (ID) representing a contact person in the communication system, and presenting the contact ID on the contact list;
  b) keeping track of a contact frequency between the user and the contact person;
  c) selecting one of the attributes from said attribute library module in accordance with the contact frequency;
  d) presenting the selected attribute on the contact list, such that the selected attribute is associated with the contact ID, the selected attribute being presented on the contact list when the contact person is logged into the communication system;
  e) generating a client account for the user, and storing the contact list, the contact ID, the contact frequency, and a record of the selected attribute in the client account;
  f) detecting when the contact person logs out of the communication system, and one of removing and only partially presenting the selected attribute on the contact list;
  g) in response to the contact person again logging into the communication system, retrieving the record of the selected attribute and fully presenting the selected attribute on the contact list, such that the selected attribute is associated with the contact ID; and
  h) when there is a communication session between the user and the contact person, increasing the contact frequency by a predetermined amount, and if the increased contact frequency exceeds a predetermined value, selecting an updated attribute in accordance with the increased contact frequency, updating the record of the attribute to correspond to the updated attribute, and presenting the updated attribute on the contact list, such that the updated attribute is associated with the contact ID.

11. The apparatus of claim 10, wherein the selected attribute is one of a color, a size, and a color shade.

12. The apparatus of claim 11, wherein, the selected attribute is used to one of color the contact ID, vary a size of the contact ID, and vary a color shade of the contact ID.

13. The apparatus of claim 11, wherein the method of managing the contact list further includes generating an icon which is associated with the contact ID, and wherein, the selected attribute is used to one of color the icon, vary a size of the icon, and vary a color shade of the icon.

14. The apparatus of claim 13, wherein the communication system is an instant messaging system, the method of managing the contact list further including coloring only a portion of the icon in response to the contact person logging out of the instant messaging system.

15. The apparatus of claim 10, wherein the selected attribute is an icon shape, the method of managing the contact list further including generating an icon which is associated with the contact ID, and in step d), the selected attribute is used to determine a shape of the icon.

16. The apparatus of claim 15, wherein the communication system is an instant messaging system, the method of managing the contact list further including only partially presenting the icon in response to the contact person logging out of the instant messaging system.

17. The apparatus of claim 10, wherein, in step c), the selected attribute is selected based on the relation of the contact frequency to a plurality of threshold values.

18. The apparatus of claim 10, wherein the contact frequency is determined based on one of an accumulated total number of communication sessions between the user and the contact person, and a total number of communication sessions between the user and the contact person within a predetermined time period.

* * * * *